UNITED STATES PATENT OFFICE.

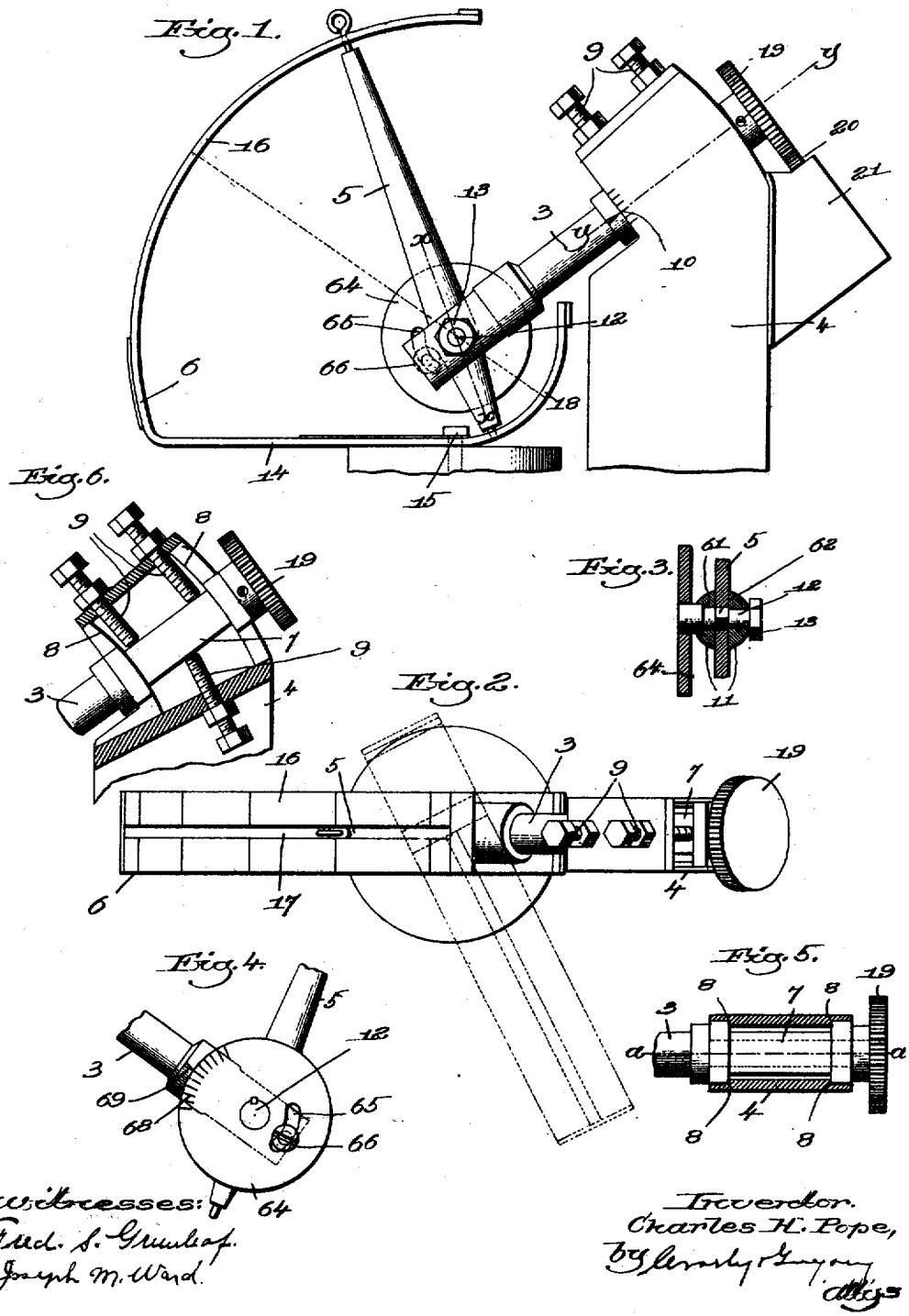

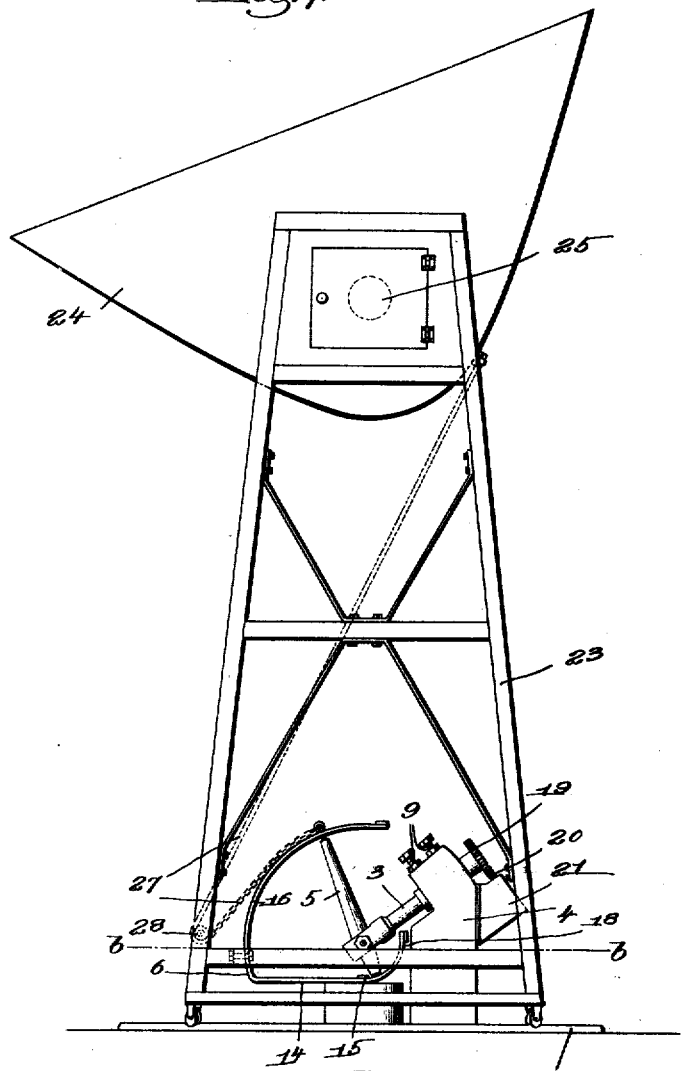

CHARLES H. POPE, OF CAMBRIDGE, MASSACHUSETTS.

ORIENTING MECHANISM.

No. 913,051.  Specification of Letters Patent.  Patented Feb. 23, 1909.

Application filed May 14, 1907. Serial No. 373,692.

*To all whom it may concern:*

Be it known that I, CHARLES H. POPE, a citizen of the United States, residing in Cambridge, county of Middlesex, and State of Massachusetts, have invented an Improvement in Orienting Mechanism, of which the following description, in connection with the accompanying drawing, is a specification, like numerals on the drawing representing like parts.

This invention has for its object to provide a novel orienting mechanism, by which term I mean a device which when attached to any apparatus will cause the latter to continually face the sun or any other heavenly body during its apparent motion athwart the sky.

My orienting mechanism can be used in connection with a solar apparatus for causing the reflector to follow the apparent course of the sun, or in connection with astronomical, telescopic or photographic apparatus for causing such apparatus to follow the course of any heavenly body. It may also be used for determining latitude or in a variety of other ways.

For the purpose of illustrating and describing my invention and its manner of use I have chosen to show it in connection with a solar apparatus of the general type illustrated and described in my Patent No. 820,127, dated May 8, 1906, but I wish it distinctly understood that the orienting mechanism herein described is capable of use in connection with other apparatus.

I will first describe one embodiment of my invention and then point out the novel features thereof in the appended claims.

Figure 1 is a side view of an orienting mechanism embodying my invention; Fig. 2 is a top plan view; Fig. 3 is a section on line $x—x$, Fig. 1; Fig. 4 is a side view of Fig. 3 looking from the left; Fig. 5 is a section on line $y—y$, Fig. 1; Fig. 6 is a section on line $a—a$, Fig. 5; Fig. 7 is a view showing how the device may be used for operating a solar apparatus; Fig. 8 is a section on a reduced scale on the line $b—b$, Fig. 7.

My orienting mechanism as herein illustrated comprises a shaft which is adjustably mounted so that it may be always directed toward the north or polar star and which, therefore, stands parallel with the axis of the earth (which shaft I will refer to for convenience as the "polar shaft"); an arm or pointer adjustably carried by the shaft so that it may be directed toward the sun or any other heavenly body; and an element (hereinafter termed for convenience the "meridian element") which is rotatable about a vertical axis and is actuated in its movement by the pointer carried by the polar shaft. The polar shaft is arranged to be driven at a speed corresponding to the rotation of the earth about its axis and during its rotation the pointer carried thereby will when properly set be constantly directed toward any selected heavenly body and at the same time the movement of the pointer will cause the meridian element to be swung about its vertical axis from east to west to also follow the apparent motion of the heavenly body.

In the present embodiment of my invention, 3 is the polar shaft which is mounted in any suitable fixed bearing member 4. 5 is the arm or pointer carried thereby, and 6 is the meridian element. The polar shaft 3 is situated so that its axis of motion intersects the axis of motion of the meridian element 6, and the point of intersection forms a fixed point about which all points of the apparatus move. The polar shaft 3 is adjustably mounted in the bearing 4, so that it may be set parallel with the axis of the earth or directed toward the polar star at any place where it may be used, and the manner of adjusting it is such that in all adjusted positions thereof its axis will pass through the fixed point above mentioned. Any devices for thus adjustably mounting the polar shaft may be employed without departing from my invention, and as one convenient construction, I have shown said shaft as mounted in a box 7 which is adjustable on the post or bearing 4 in an arc of a circle having the fixed point previously mentioned as its center. This box is shown as confined between shoulders 8 formed in the bearing 4, which shoulders are formed on the arc previously mentioned, and the box is held in its adjusted position by clamping screws 9 which are secured in the post or bearing 4. Preferably the side of the bearing will be graduated, as at 10, to indicate degrees by which the exact angle of the shaft with the horizon may at any time be indicated, this angle, when the apparatus is propely adjusted, corresponding to the latitude or the polar altitude of the place where the instrument is located.

The arm or pointer 5 extends radially from the polar shaft 3 and is pivoted thereto so that its axis of movement relative to the shaft passes through the fixed point. Said arm or pointer may thus be adjusted relative to the shaft to form different angles therewith, and for holding it in any adjusted position, I have herein shown the end of the polar shaft as forked, as at 11, and the arm or pointer 5 as received between the forked end and mounted on the stud 12. Said stud is provided with the shoulder 61 to engage a shoulder in one branch of the fork 11, with a non-circular portion 62 on which the pointer 5 is received, and with a clamping nut 13 by which the pointer may be clamped fixedly in any adjusted position. This particular manner of clamping the pointer in any fixed position to the shaft is not essential to my invention, however. I have also shown the stud 12 as having a head 64 which is provided with a slot 65 in which is received a clamping screw 66, said screw being screw-threaded into one branch of the fork 11 and operating to assist in clamping the arm or pointer 5 in its adjusted position. If desired I may also provide the head with a scale 68 representing either degrees or seasons of the year with which coöperates an indication mark 69 on the shaft 3. This scale may be used in setting the pointer 5 to correspond with the time of year, or the scale or the marks on the face of the meridian element may be used for this purpose.

The meridian element 6 is formed with the base portion 14 which is pivoted at 15 to turn about a vertical axis which intersects the fixed point above mentioned, and said meridian element is provided with the curved portion 16, the curve of which is on a circle struck from the fixed point as a center. This curved portion 16 is shown as being slotted, as at 17, and the end of the pointer 5 is received in said slot. As a result whenever the shaft 3 is turned in either direction the arm or pointer 5 by engaging in the slot 17 causes the meridian element 6 to be turned about its pivot 15, and during such turning movement the end of the pointer 5 will rise and fall in the slot 17. In case the meridian element 6 or the part to be moved thereby is comparatively heavy, I may if desired make the base 14 with another upwardly-extending slotted portion 18 into the slot of which the lower end of the arm or pointer 5 engages. Where this construction is employed the arm or pointer 5 acts on the meridian element both sides of the pivot 15 and thus any binding or cramping may be avoided and more perfect control is secured.

In using the device for causing an object to follow the course of the sun, the polar shaft 3 will be first adjusted at the proper angle so that it will be directed toward the north or polar star. The angle at which said shaft is adjusted to direct it toward the polar star will, of course, be different in different latitudes. The arm 5 is then adjusted so that at any time it is directed toward the sun and then it is clamped in this position. The angular position of the arm on the shaft 5 to secure this result will, of course, vary at different times of the year. At the equinox said arm will be at a right angle to the shaft, while in north latitudes during the winter months, said arm will be inclined into the dotted line position $d$, Fig. 1, and in summer months will be shifted to the other side of the right angle into substantially full line position Fig. 1. If desired the meridian element 6 will be provided with indication marks which will assist a person in setting the arm to accord with the time of year. When the apparatus is thus set if the shaft is rotated at the proper speed the arm or pointer 5 will always be directed toward the sun at all times of the day, and an element secured to said arm or operated thereby may thus always be kept pointed toward the sun.

The shaft 3 may be operated by any suitable mechanism for giving it a uniform motion at the proper speed, and I have herein illustrated said shaft as having a gear 19 thereon which meshes with a gear 20 operated by a suitable clock work 21.

While my apparatus as thus far described may be used for a variety of purposes, I have in the drawings illustrated it as used in connection with a solar apparatus such as shown and described in my Patent No. 820,127. This solar apparatus comprises a standard 23 adapted to revolve on a track 37 about a vertical axis, and a reflector 24 mounted on the standard and arranged to turn thereon about a horizontal axis 25. In using my orienting mechanism with this type of solar apparatus I fasten the standard 23 to the meridian element 6 so that said standard will move with the meridian element about the pivot 15 and I connect the reflector to the arm or pointer 5 by means of a flexible connection 27, said flexible connection being shown as passing down over the direction pulley 28 so that as the arm or pointer 5 rises in the slot, the back side of the reflector is drawn down to point the reflector upwardly. When said arm or pointer moves downwardly in the slot the flexible connection is slackened, and the weight of the front portion of said reflector causes it to swing downwardly, said weight of the front portion being sufficient to keep the connection 27 taut at all times. When the orienting mechanism is used thus, the reflector will be turned about a vertical axis by the meridian element and at the same time about its horizontal axis by the arm or pointer 5, thus causing it to be directed toward the sun at all times of the day.

It will be obvious that by properly adjusting the pointer 5 my orienting mechanism may also be used for giving movement to telescopes or photographic apparatus for causing them to follow the course of any heavenly body. My apparatus can also be used for determining the latitude of any place by simply setting the pointer so that it will have the correct angular relation to the shaft 3 to correspond to the day of the year on which the determination of latitudes is to be made, and then adjusting the shaft 3 until the pointer is directed toward the sun. The inclination of the shaft 3 will then correspond to the polar altitude or latitude of the place where the observation is made and such latitude can be found by simply reading the scale 10.

I have not attempted to show herein all forms of my invention but have illustrated one embodiment only.

Having fully described my invention, what I claim as new and desire to secure by Letters Patent is:—

1. In an orienting mechanism, the combination with a polar shaft, of a pivoted meridian element and an arm carried by said shaft and operatively engaging the meridian element.

2. In an orienting mechanism, the combination with a polar shaft, of an arm extending radially therefrom, and a meridian element pivoted to turn about a vertical axis and having operative engagement with said arm.

3. In an orienting mechanism, the combination with a polar shaft, of means to sustain said shaft in an inclined position, an arm extending radially from said shaft, and a meridian element pivoted to turn about an axis which intersects that of the shaft, said element having operative engagement with said arm.

4. In an orienting mechanism, the combination with a polar shaft, of means to rotate said shaft, an arm extending radially from the shaft, and a meridian element having operative engagement with the arm and pivoted to turn about an axis which intersects that of the shaft at the point where the arm radiates therefrom.

5. In an orienting mechanism, the combination with an adjustably-mounted polar shaft, of an arm extending radially therefrom and adjustable thereon, and a meridian element having operative engagement with the arm and mounted to turn about an axis which intersects that of the shaft at the point from which the arm radiates.

6. In an orienting mechanism, the combination with a polar shaft of an arm extending radially therefrom at a fixed point and adjustable to vary the angular relation between the arm and shaft, and a meridian element having operative engagement with the arm and mounted to turn about an axis which intersects that of the shaft at the point from which the arm radiates.

7. In an orienting mechanism, the combination with a polar shaft, of means for adjusting said shaft to vary the angular inclination thereof and to maintain it in all positions with its axis passing through a fixed point, an arm extending radially to said shaft from said fixed point, and a meridian element having operative engagment with the arm and mounted to turn about an axis which intersects said fixed point.

8. In an orienting mechanism the combination with a polar shaft adjustably mounted whereby its inclination to the horizon may be varied, of an arm extending radially from said shaft and a slotted meridian element mounted to turn about an axis which intersects the axis of the shaft at the point from which the arm radiates, said arm engageing said slot.

In testimony whereof, I have signed my name to this specification, in the presence of two subscribing witnesses.

CHARLES H. POPE.

Witnesses:
BERTHA F. HEUSER,
LOUIS C. SMITH.